(12) United States Patent
Picot

(10) Patent No.: US 8,100,233 B2
(45) Date of Patent: Jan. 24, 2012

(54) DISC-BRAKE VIBRATION DAMPER

(75) Inventor: Pascal Picot, Brie Conte Robert Bosch (FR)

(73) Assignee: Robert Bosch GmbH, Stuttgart (DE)

( * ) Notice: Subject to any disclaimer, the term of this patent is extended or adjusted under 35 U.S.C. 154(b) by 527 days.

(21) Appl. No.: 12/265,865

(22) Filed: Nov. 6, 2008

(65) Prior Publication Data

US 2009/0114490 A1 May 7, 2009

(30) Foreign Application Priority Data

Nov. 6, 2007 (FR) ..................................... 07 07813

(51) Int. Cl.
*F16D 65/38* (2006.01)

(52) U.S. Cl. ..................... 188/73.37; 188/250 E; 92/84

(58) Field of Classification Search ............... 188/73.37, 188/72.4, 72.5, 73.1, 217, 218 A, 250 E, 188/370; 92/84, 129, 187–191
See application file for complete search history.

(56) References Cited

U.S. PATENT DOCUMENTS

| 3,722,634 | A |   | 3/1973 | Ogasawara et al. |
|---|---|---|---|---|
| 4,222,463 | A | * | 9/1980 | Domes et al. ............... 188/72.3 |
| 4,605,104 | A | * | 8/1986 | Thompson ................... 188/72.4 |
| 5,014,827 | A |   | 5/1991 | Wang et al. |
| 5,031,511 | A | * | 7/1991 | Villata ............................ 92/128 |
| 7,156,212 | B1 |   | 1/2007 | Ciotti et al. |

FOREIGN PATENT DOCUMENTS

| JP |           63167132 |   | 7/1988 |
|----|--------------------|---|--------|
| JP | 2004205042 A       | * | 7/2004 |

OTHER PUBLICATIONS

FR 0707813 Search Report and Written Opinion.

* cited by examiner

*Primary Examiner* — Pamela Rodriguez

(74) *Attorney, Agent, or Firm* — Michael Best & Friedrich LLP

(57) ABSTRACT

A disk brake vibration damper comprising a cylindrical element (4) equipped on its cylindrical peripheral surface (41) with a layer of a supple material (5) which exhibits properties of adhesion with the materials of the piston (3) and of the cylindrical element (4). This cylindrical element (4) is intended to be positioned inside an axial cavity (30) of the piston with the layer of supple material (5) in contact with the interior wall (31) of the cavity of the piston (3).

28 Claims, 1 Drawing Sheet

DISC-BRAKE VIBRATION DAMPER

BACKGROUND AND SUMMARY OF THE INVENTION

The invention relates to a vehicle brake vibration damper, to a brake piston and to a brake comprising such a damper.

In a vehicle equipped with disk brakes, each wheel that has to be retarded by a braking system such as this comprises a brake disk secured to the wheel and a braking device secured to the chassis of the vehicle and which, through friction, slows the rotational movement of the disk.

The braking device comprises, on each side of the brake disk, a brake pad borne by a backing plate. Each backing plate is able to move at right angles to the plane of the disk and is guided at both ends in housings in a yoke.

The command to apply braking is transmitted in the known way by a hydraulic circuit filled with a brake fluid. A braking control, generally located at the driving position allows action on a system of pistons so that the braking effort can be transmitted to the brake pads via the brake fluid.

The brake pads work by rubbing brake linings against the brake disk and, during braking, tightly grip the disk and slow the rotation thereof.

However, when the brake linings such as the brake pads come into contact with a rotary member secured to an axle of the vehicle, such as a brake disk, and when this rotary member is slowed, vibrations may arise. These vibrations are more noticeable and annoying under moderate braking than under heavy sudden braking because moderate braking often lasts for longer, is employed more frequently, and the driver of the vehicle is generally more attentive to how his vehicle is behaving and to the noise being made. Furthermore, moderate braking generally occurs at low speed when the vehicle is often less noisy and the noise of vibration due to braking is far more noticeable.

In spite of attempts made to limit these vibrations, experience shows that these cannot be eliminated and that, in any event, as the vehicle ages and its parts become worn, there will always be the risk of vibrations.

One solution is therefore to damp these vibrations and the acoustic frequencies they generate throughout the vehicle.

The invention therefore provides measures for damping these vibrations.

The invention therefore relates to a disk brake vibration damper which comprises a piston intended to apply an axial braking pressure to a brake pad. The damper according to the invention comprises a cylindrical element equipped on its cylindrical peripheral surface with a layer of a supple material which exhibits good properties of adhesion with the material of the piston and with the material of said cylindrical element. Said cylindrical element is intended to be positioned inside an axial cavity of the piston with said layer of supple material in contact with the interior wall of the cavity of the piston.

Advantageously, said layer of supple material is made of a viscous material.

According to one embodiment, the layer of viscous material is made of a viscoelastic material.

According to one nonlimiting embodiment, provision will be made for said cylindrical element to be a cylindrical ring.

According to another embodiment of the invention, the cylindrical element slides in said cavity of the piston and hermetically seals this cavity.

Advantageously, said cylindrical element is made of a metallic material.

As an alternative, provision may just as easily be made for said cylindrical element to be made of a plastic.

The invention also relates to a brake piston using the damper thus described.

The invention also relates to a vehicle disk brake applying this brake piston fitted with this damper.

BRIEF DESCRIPTION OF THE DRAWINGS

The various objects and features of the invention will become more clearly apparent in the description which will follow and in the attached figures which depict.

DETAILED DESCRIPTION

Figure 1:
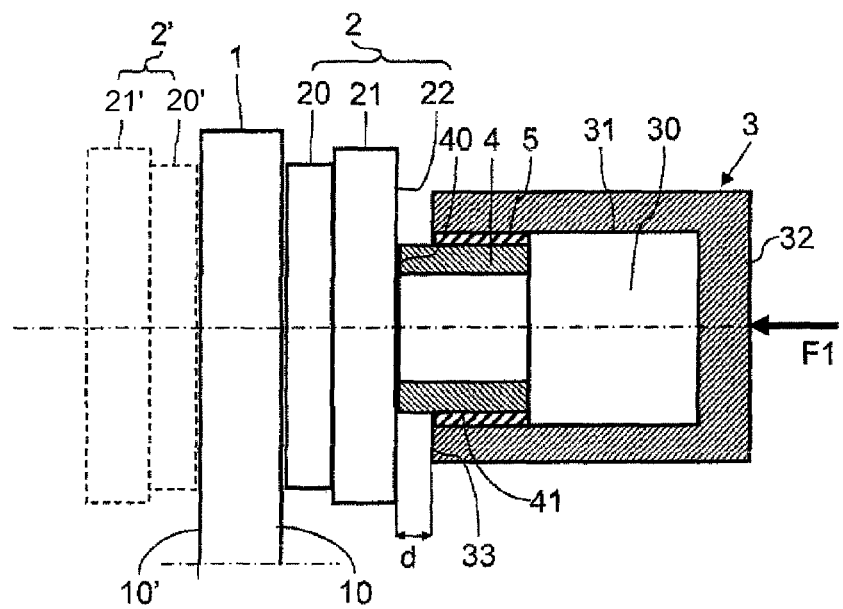
FIG. 1: a cross section through one exemplary embodiment of a disk brake incorporating the vibration damper according to the invention.

FIG. 1 depicts one exemplary embodiment of a disk brake according to the invention.

Two brake pads 2 and 2' are located one on each side of a brake disk 1 that is depicted only in part. As is known in the art, this brake disk is secured to a wheel of a vehicle.

The brake pads 2 and 2' comprise brake pad linings 20 and 20' which are mounted on brake lining backing plates 22 and 22'. These backing plates can slide at right angles to the plane of the disk.

A caliper and a yoke, neither of which has been depicted, have arms positioned on each side of the brake disk. According to one commonplace disk brake system known in the art, two brake pads 2 and 2' are slideably mounted in the yoke on each side of the brake disk so that each can rub against a respective face 10 and 10' of the brake disk.

In FIG. 1, the pad 2 is driven axially by the piston 3 at right angles to the plane of the brake disk so as to come into contact with the face 10 of the disk.

As is known in the art, the brake pads 2 and 2' move at right angles to the plane of the disk while remaining parallel to this plane, and the brake pad lining 20 may rub against the face 10 of the disk 1.

The movement of the brake pad 2 is brought about by a wheel cylinder in which the piston 3 of the wheel cylinder is located. The wheel cylinder is connected to the hydraulic braking circuit of the vehicle.

When the vehicle brakes are actuated, a brake fluid is compressed in a master cylinder of the brake circuit. The pressure developed is transmitted to the wheel cylinders and has the effect of driving the piston 3 and of inducing a force F1 towards the brake pad 2 on the face 32 of the piston 3.

With the type of disk brake described hereinabove and in commonplace use, the piston 3 drives the brake pad 2 until the brake pad lining 20 comes into contact with the disk. Bearing against the disk via the brake pad 2 and the brake pad lining 20, the piston pulls the caliper towards it and this caliper brings with it the other brake pad 2' and brake pad lining 20'. This lining comes into contact with the face 10' of the brake disk. As the pressure in the master cylinder increases, the force F1 increases and the brake disk is slowed by the two brake pad linings 20 and 20' being pressed against the faces 10 and 10' of the disk.

As may be seen in FIG. 1 and in the known way, the piston 2 is hollow in order to limit the thermal inertia of the braking system as a whole, because braking is achieved through the friction of the brake pad linings against the brake disk. The brake pad linings therefore heat up and the heat is imparted to the brake lining backing plates, to the caliper and to the pistons of the wheel cylinders. It is beneficial to ensure that these various components are cooled as quickly as possible. To do that, their thermal inertias are reduced as far as possible. As far as the piston of a wheel cylinder is concerned, one solution is to hollow out the central part of the piston. The piston 3 therefore acts on the brake lining backing plate 21 via its peripheral part situated around the cavity 30.

By way of an exemplary embodiment, the vibration damper according to the invention will be described in its application to a braking system such as this already described. However, it must be clearly understood that the damper according to the invention can be employed in a fixed brake comprising two pistons positioned facing one another on each side of the disk 1.

It will be observed that a main source of vibrations lies with the brake pad linings and that the piston of the brake cylinder is a means of transmitting the vibrations. The invention proposes to damp the vibrations as close as possible to their source. This is why the invention intends to create a vibration damper between the piston and the brake pad.

The invention provides a damping element intended, when the brakes are commanded, to come into contact first with the brake pad.

This damping element has a cross section (at right angles to its axis) which is similar to the cross section of the cavity 30 of the piston.

Advantageously, this damping element is cylindrical or substantially cylindrical and is positioned in the cavity 30 of the piston 3 in the way depicted in FIG. 1.

For example, this damping element is in the form of a cylindrical ring 4 the diameter of the exterior wall 41 of which is less than the diameter of the interior wall 31 of the cavity 30 of the piston.

Between the wall 41 and the wall 31 there is a material 5 which sticks to the two walls 41 and 31. Furthermore, the material 5 advantageously has properties of elasticity.

Advantageously, the material 5 is a viscoelastic material. It may, for example, be nitrile based.

The damping element 4 is positioned in the cavity 30 in such a way that under no braking, its face 40 emerges from the face 33 of the piston by a distance d.

When the braking is commanded, a force F1 is applied to the face 32 of the piston 3. This piston moves axially to the left (in FIG. 1). The damping element presses axially against the face 22 of the pad. The brake pad lining 20 of the pad comes into contact with the disk 1. Light braking is initiated. As the braking force F1 increases, the piston 3 continues to move to the left but the damping element cannot move any further. The piston 3 therefore moves with respect to the damping element 4 as a result of the viscoelastic nature of the material 5. The distance d separating the face 33 of the piston from the face 22 of the pad is reduced until the face 33 comes into contact with the face 22. The piston then acts directly on the pad 2.

It can therefore be seen that, during a phase at the onset of braking or under light braking, the piston acts on the brake pad via the damping element 4. During this phase, the damping element 4 damps and/or absorbs any vibrations that might be generated when the brake pad lining 20 is in contact with the disk 1. The vibrations which are damped and/or absorbed are, in particular, vibrations propagated axially. However, vibrations parallel to the plane of the disk may also be absorbed.

When the command to brake ceases, the force F1 decreases. The piston moves to the left and returns to its position of rest with its face 33 lying at the distance d away from the face 22 of the brake pad. Because of the elastic properties of the material 5, the damping element 4 moves to the left to return to the position depicted in FIG. 1.

Figure 2:
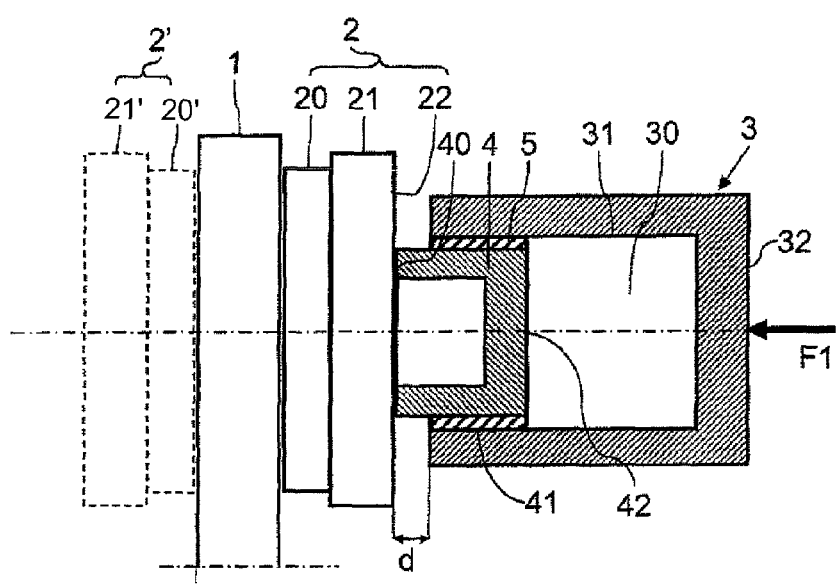
FIG. 2: a cross section through one exemplary embodiment of a disk brake incorporating an alternative form of embodiment of a vibration damper according to the invention.

FIG. 2 depicts an alternative form of the embodiment of the damping element 4 according to the invention.

This damping element has a face 42 which is able to seal the cavity 30 of the piston imperviously with the cooperation of the viscoelastic material 5. This being the case, when braking is commanded, the air contained in the cavity 30 will be compressed by the damping element 4 and will contribute to returning the damping element to its rest position when the command to brake ceases.

By way of nonlimiting example, the damping element 4 is made of a metallic material or of a plastic.

The invention also relates to a wheel brake piston incorporating a damping element such as this as depicted in FIGS. 1 and 2 for example.

The invention also relates to a disk brake equipped with such a wheel brake piston.

The invention claimed is:

1. Disk brake vibration damper comprising a piston (3) intended to apply an axial braking pressure (F1) to a brake pad (2), the piston having a face (33) engageable with the brake pad, characterized in that the damper also comprises a cylindrical element (4) having a face (40) engageable with the brake pad and a cylindrical peripheral surface (41), the peripheral surface having thereon a layer of a supple material (5) which exhibits properties of adhesion with the materials of the piston and of the cylindrical element, said cylindrical element (4) being positioned inside an axial cavity (30) of the piston with said layer of supple material (5) in contact with an interior wall (31) of the cavity of the piston (3), the cylindrical element (4) sliding in said cavity (30) of the piston as the face of the piston moves into and out of engagement with the brake pad.

2. Disk brake vibration damper according to claim 1, characterized in that said layer of supple material (5) that exhibits properties of adhesion of the materials of the piston and of the cylindrical element is made of a viscous material.

3. Disk brake vibration damper according to claim 2, characterized in that the layer of viscous material (5) is made of a viscoelastic material.

4. Disk brake vibration damper according to claim 1, characterized in that said cylindrical element (4) is a cylindrical ring.

5. Disk brake vibration damper according to claim 4, characterized in that the cylindrical element has a cylindrical wall providing the cylindrical peripheral surface and an inner end face (42) sealing the cavity (30).

6. Disk brake vibration damper according to claim 1, characterized in that said cylindrical element (4) is made of a metallic material.

7. Disk brake vibration damper according to claim 1, characterized in that said cylindrical element (4) is made of a plastic.

8. Disk brake vibration damper according to claim 1, characterized in that, under no braking, the face (40) of the cylindrical member (4) emerges from the face (33) of the piston (3) by a distance (d), and in that, under braking, a distance between the face (40) of the cylindrical member (4) and the face (33) of the piston (3) decreases.

9. Disk brake vibration damper according to claim 1, characterized in that, under braking, the face (40) of the cylindrical member (4) and the face (33) of the piston (3) are aligned in a plane.

10. Vehicle wheel brake piston (3) intended to apply an axial braking pressure (F1) to a brake pad (2), the piston having a face (33) engageable with the brake pad, the piston also comprising a disk brake vibration damper including a cylindrical element (4) having a face (40) engageable with the brake pad and a cylindrical peripheral surface (41), the peripheral surface having thereon a layer of a supple material (5) which exhibits properties of adhesion with the materials of the piston and of the cylindrical element, said cylindrical element (4) being positioned inside an axial cavity (30) of the piston with said layer of supple material (5) in contact with an interior wall (31) of the cavity of the piston (3), the cylindrical element (4) sliding in said cavity (30) of the piston as the face of the piston moves into and out of engagement with the brake pad.

11. Vehicle wheel brake piston according to claim 10, characterized in that said layer of supple material (5) that exhibits properties of adhesion of the materials of the piston and of the cylindrical element is made of a viscous material.

12. Vehicle wheel brake piston according to claim 11, characterized in that the layer of viscous material (5) is made of a viscoelastic material.

13. Vehicle wheel brake piston according to claim 10, characterized in that said cylindrical element (4) is a cylindrical ring.

14. Wheel brake piston according to claim 13, characterized in that the cylindrical element has a cylindrical wall providing the cylindrical peripheral surface and an inner end face (42) sealing the cavity (30).

15. Vehicle wheel brake piston according to claim 10, characterized in that said cylindrical element (4) is made of a metallic material.

16. Vehicle wheel brake piston according to claim 10, characterized in that said cylindrical element (4) is made of a plastic.

17. Wheel brake piston according to claim 10, characterized in that, under no braking, the face (40) of the cylindrical member (4) emerges from the face (33) of the piston (3) by a distance (d), and in that, under braking, a distance between the face (40) of the cylindrical member (4) and the face (33) of the piston (3) decreases.

18. Wheel brake piston according to claim 10, characterized in that, under braking, the face (40) of the cylindrical member (4) and the face (33) of the piston (3) are aligned in a plane.

19. Vehicle disk brake, comprising a brake pad (2), and a wheel brake piston for applying an axial braking pressure (F1) to the brake pad (2), the piston having a face (33) engageable with the brake pad, the brake also comprising a vibration damper including a cylindrical element (4) having a face (40) engageable with the brake pad and a cylindrical peripheral surface (41), the peripheral surface having thereon a layer of a supple material (5) which exhibits properties of adhesion with the materials of the piston and of the cylindrical element, said cylindrical element (4) being positioned inside an axial cavity of the piston with said layer of supple material (5) in contact with an interior wall (31) of the cavity of the piston (3), the cylindrical element (4) sliding in said cavity (30) of the piston as the face of the piston moves into and out of engagement with the brake pad.

20. Vehicle disk brake according to claim 19, characterized in that said layer of supple material (5) that exhibits properties of adhesion of the materials of the piston and of the cylindrical element is made of a viscous material.

21. Vehicle disk brake according to claim 20, characterized in that the layer of viscous material (5) is made of a viscoelastic material.

22. Vehicle disk brake according to claim 19, characterized in that said cylindrical element (4) is a cylindrical ring.

23. Vehicle disk brake according to claim 22, characterized in that the cylindrical element has a cylindrical wall providing the cylindrical peripheral surface and an inner end face (42) sealing the cavity (30).

24. Vehicle disk brake according to claim 19, characterized in that said cylindrical element (4) is made of a metallic material.

25. Vehicle disk brake according to claim 19, characterized in that said cylindrical element (4) is made of a plastic.

26. Vehicle disk brake according to claim 19, characterized in that, under no braking, a face (40) of the cylindrical member (4) emerges from the face (33) of the piston (3) by a distance (d), and in that, under braking, a distance between the face (40) of the cylindrical member (4) and the face (33) of the piston (3) decreases.

27. Vehicle disk brake according to claim 19, characterized in that, under braking, the face (40) of the cylindrical member (4) and the face (33) of the piston (3) are aligned in a plane and engage the brake pad.

28. Vehicle disk brake according to claim 19, characterized in that the brake pad includes a brake pad lining engageable against a brake disk and a backing plate, during braking, the face of the piston and the face of the cylindrical member engaging the backing plate.

\* \* \* \* \*